(12) United States Patent
Funnell

(10) Patent No.: US 9,481,115 B2
(45) Date of Patent: Nov. 1, 2016

(54) MOULDING TOOL AND METHOD OF MANUFACTURING A PART

(71) Applicant: Airbus Operations Limited, Bristol (GB)

(72) Inventor: Marc Edwin Funnell, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 13/773,999

(22) Filed: Feb. 22, 2013

(65) Prior Publication Data

US 2013/0240130 A1     Sep. 19, 2013

Related U.S. Application Data

(62) Division of application No. 12/310,138, filed as application No. PCT/GB2007/002819 on Jul. 25, 2007, now abandoned.

(30) Foreign Application Priority Data

Aug. 14, 2006     (GB) .................................. 0616121.0

(51) Int. Cl.
*B29C 70/32*     (2006.01)
*B29C 33/48*     (2006.01)
(Continued)

(52) U.S. Cl.
CPC ........... *B29C 43/021* (2013.01); *B29C 33/306* (2013.01); *B29C 33/48* (2013.01);
(Continued)

(58) Field of Classification Search
CPC .................... B29L 2031/3085; B29C 70/446; B29C 33/306; B29C 43/021; B29C 70/44; B29C 70/342; B29C 70/32; B29C 70/543; B29C 33/48; B29D 99/0014; B29D 99/0025; B29D 99/0028

USPC ............. 156/173; 244/123.14, 123, 2, 123.3, 244/123.4, 123.7, 123.8
See application file for complete search history.

(56) References Cited

U.S. PATENT DOCUMENTS

| 3,795,559 | A | 3/1974 | Horn et al. |
| 3,999,930 | A | 12/1976 | Telbizoff et al. |

(Continued)

FOREIGN PATENT DOCUMENTS

| DE | 37 39 753 | 6/1989 |
| EP | 0 444 627 | 9/1991 |

(Continued)

OTHER PUBLICATIONS

English Translation of Office Action dated Jan. 17, 2012 in JP 2009-524221.

(Continued)

*Primary Examiner* — William Bell
(74) *Attorney, Agent, or Firm* — Nixon & Vanderhye P.C.

(57) ABSTRACT

A tool set comprising: a molding tool comprising a molding surface and a mandrel recess in the molding surface; a first mandrel configured to fit into the mandrel recess and form a first component; and a second mandrel configured to fit into the mandrel recess and form a second component which has a different shape or size to the first component. A method of manufacturing a part, the method comprising: arranging a set of components on one or more inner mould line tools; forming a layer around the inner mould line tool(s); fitting a pair of outer mould line tools on opposite sides of the inner mould line tool(s); molding the part by compressing the layer and the components between the inner and outer mould line tools; and removing the inner mould line tool(s) from the part.

10 Claims, 15 Drawing Sheets

(51) Int. Cl.
| | |
|---|---|
| *B29C 43/02* | (2006.01) |
| *B29D 99/00* | (2010.01) |
| *B29C 33/30* | (2006.01) |
| *B29C 70/44* | (2006.01) |
| *B29C 70/34* | (2006.01) |
| B29L 31/30 | (2006.01) |
| B29K 105/08 | (2006.01) |
| B64C 3/18 | (2006.01) |
| B64C 3/24 | (2006.01) |

(52) U.S. Cl.
CPC ............ *B29C 33/485* (2013.01); *B29C 70/32* (2013.01); *B29C 70/342* (2013.01); *B29C 70/44* (2013.01); *B29C 70/446* (2013.01); *B29D 99/0014* (2013.01); *B29D 99/0028* (2013.01); *B29K 2105/0809* (2013.01); *B29K 2105/0872* (2013.01); *B29L 2031/3085* (2013.01); *B64C 3/182* (2013.01); *B64C 3/187* (2013.01); *B64C 3/24* (2013.01); *Y02T 50/433* (2013.01)

(56) References Cited

U.S. PATENT DOCUMENTS

| | | | |
|---|---|---|---|
| 4,460,325 | A | 7/1984 | Hori et al. |
| 4,492,607 | A | 1/1985 | Halcomb |
| 4,822,272 | A * | 4/1989 | Yanase et al. ............... 425/328 |
| 4,946,526 | A | 8/1990 | Petty-Galis et al. |
| 5,059,377 | A | 10/1991 | Ashton et al. |
| 5,137,071 | A | 8/1992 | Ashton et al. |
| 5,190,773 | A | 3/1993 | Damon |
| 5,266,137 | A * | 11/1993 | Hollingsworth ............. 156/156 |
| 5,817,269 | A * | 10/1998 | Younie et al. ............... 264/258 |
| 5,902,535 | A | 5/1999 | Burgess et al. |
| 6,149,851 | A | 11/2000 | Deckers et al. |
| 6,217,000 | B1 * | 4/2001 | Younie et al. ............... 249/184 |
| 6,347,839 | B1 | 2/2002 | Lew et al. |
| 6,796,784 | B1 | 9/2004 | Andre |
| 2001/0051251 | A1 | 12/2001 | Noda et al. |
| 2002/0033221 | A1 | 3/2002 | Nakamura |
| 2003/0192990 | A1 * | 10/2003 | Simpson et al. ............. 244/123 |
| 2003/0218267 | A1 * | 11/2003 | Husmann et al. ............ 264/101 |
| 2004/0096535 | A1 | 5/2004 | Hudecek et al. |
| 2005/0230552 | A1 | 10/2005 | Engwall et al. |
| 2006/0249626 | A1 * | 11/2006 | Simpson ................... B64C 3/20 244/123.1 |
| 2007/0029030 | A1 * | 2/2007 | McCowin ..................... 156/173 |
| 2007/0175031 | A1 | 8/2007 | Pham et al. |
| 2008/0230652 | A1 * | 9/2008 | Biornstad ............. B29C 53/587 244/120 |
| 2008/0246175 | A1 | 10/2008 | Biornstad et al. |

FOREIGN PATENT DOCUMENTS

| | | |
|---|---|---|
| EP | 0 447 349 | 9/1991 |
| EP | 572248 A1 * | 12/1993 |
| EP | 1 134 070 | 9/2001 |
| FR | 2 440 831 | 6/1980 |
| FR | 2 626 212 | 7/1989 |
| GB | 577790 | 8/1939 |
| GB | 2 424 612 | 10/2006 |
| JP | 59-124813 | 7/1984 |
| JP | 63-179093 | 7/1988 |
| JP | 2-175135 | 7/1990 |
| JP | 3-65317 | 3/1991 |
| JP | H03-248997 | 11/1991 |
| JP | 04320826 | 11/1992 |
| JP | 11-216782 | 8/1999 |
| JP | H11-216782 | 8/1999 |
| JP | 2001-253393 | 9/2001 |
| JP | 2003-34297 | 2/2003 |
| RU | 2005 111 597 | 1/2006 |
| WO | 2004/011169 | 2/2004 |
| WO | WO 2004011169 A2 * | 2/2004 |
| WO | WO 2004/035290 | 4/2004 |

OTHER PUBLICATIONS

Russian Office Action dated Sep. 1, 2011 for RU 2009107009/05(009420) and English translation.
M.M. Paley, "Technology of Manufacturing Devices for Moulds and Dies" *Mashinostroenie,* 1979, pp. 114-119.
International Search Report for PCT/GB2007/002819 mailed Mar. 19, 2008.
Written Opinion for PCT/GB2007/002819 mailed Mar. 19, 2008.
Search Report for GB 0616121.0 dated Dec. 15, 2006.
Webster's New Collegiate Dictionary, G. & C. Merriam Co., 1977, p. 452.
Japanese Office Action dated Jul. 29, 2014 in JP 2013-128617 and English translation, 11 pages.
Extended European Search Report dated Nov. 21, 2014 in EP 14180320.5, 8 pages.

* cited by examiner

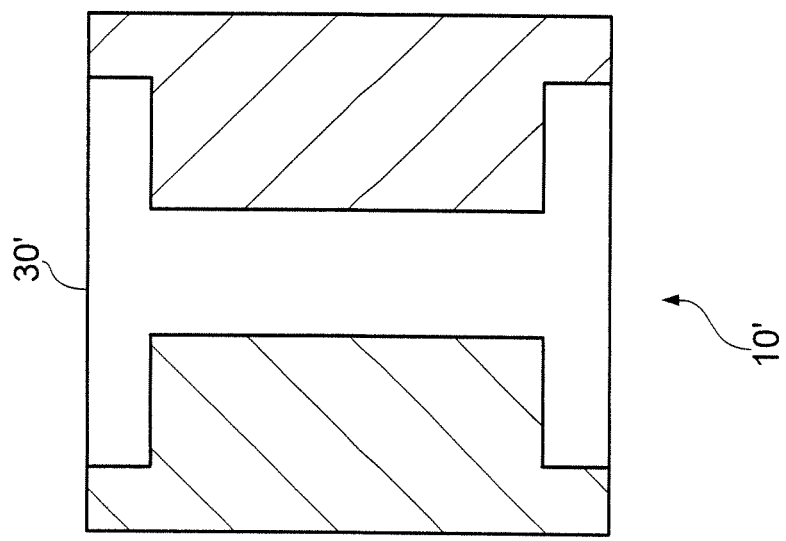
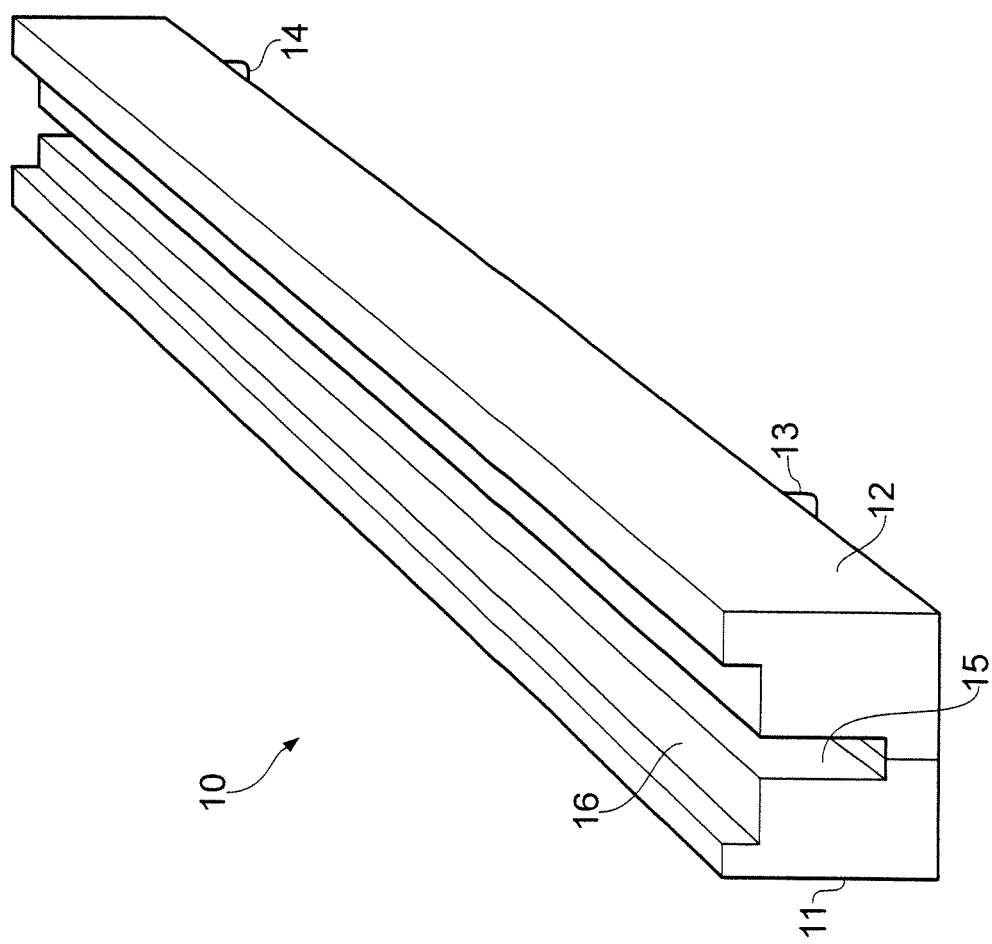
Fig. 2b
Fig. 2a

MOULDING TOOL AND METHOD OF MANUFACTURING A PART

This application is a Division of application Ser. No. 12/310,138, filed Feb. 12, 2009, which is the US national phase of international application PCT/GB2007/002819, filed in English on 25 Jul. 2007, which designated the US and claims priority to GB Application No. 0616121.0 filed 14 Aug. 14, 2006. The entire contents of these applications are incorporated herein by reference.

FIELD OF THE INVENTION

The present invention relates in its various aspects to a moulding tool, a tool set, a method of manufacturing a moulding tool, and a method of manufacturing a part such as a composite part.

BACKGROUND OF THE INVENTION

U.S. Pat. No. 5,902,535 describes an inner mould line (IML) tool for resin film infusion moulding a component in a single-step moulding operation. The IML tool comprises a plurality of mandrels in a modular design. The mandrels may be individually assembled over a preform assembly, such that the surface configurations on the underside of the mandrels match with the stringers and intercostals of the preform assembly.

SUMMARY OF THE INVENTION

A first aspect of the invention provides a moulding tool comprising a moulding surface, and a mandrel recess in the moulding surface, wherein the mandrel recess has a mandrel locator configured to engage with a mandrel so as to locate the mandrel at a desired position in the mandrel recess.

Providing a mandrel recess in the moulding surface enables a mandrel to be fitted easily and accurately relative to the moulding surface.

Typically the mandrel locator is configured to engage with the mandrel by means of a male/female connection (such as a hole or pin).

A plurality of mandrel recesses may be formed in the moulding surface, which is typically a contiguous piece of material. Thus each mandrel recess can be used to receive a mandrel for a respective component such as a stringer, or an additional component such as a spar, rib foot or rib post.

The tool may have only a single moulding surface on one side—for example for forming a half wing-box. Alternatively the tool may have a second moulding surface (either adjacent to or opposite to the first moulding surface); and one or more mandrel recesses in the second moulding surface, each configured to receive a respective mandrel. In this case the tool can be used to form a tubular part such as a full wing-box.

Typically each recess has been formed by removing material from the moulding tool—for instance by machining from a billet.

A further aspect of the invention provides a tool set comprising:
  a moulding tool according to the first aspect of the invention;
  a first mandrel configured to fit into the mandrel recess and form a first component; and
  a second mandrel configured to fit into the mandrel recess and form a second component which has a different shape or size to the first component.

Thus the tool can be used in a modular tool set, in which a variety of mandrels can be interchangeably fitted into the mandrel recess(es) to form a desired component.

A further aspect of the invention provides a tool set comprising:
  a moulding tool according to the first aspect of the invention;
  two or more stringer mandrels each configured to fit into a respective one of the stringer mandrel recesses and form a respective stringer; and
  one or more additional mandrels each configured to fit into a respective one of the additional mandrel recesses and form a respective additional component.

Thus the moulding tool can accommodate mandrels for stringers and also for additional components such as rib feet, spars and/or rib posts.

A further aspect of the invention provides a method of manufacturing a part, the method comprising:
  arranging a component on a mandrel;
  fitting the mandrel into a mandrel recess of a moulding tool;
  arranging a panel with a first portion of the panel engaging a moulding surface of the moulding tool and a second portion of the panel engaging the component on the mandrel;
  bonding the first portion of the panel to the component by compressing them against the first mandrel; and
  moulding the second portion of the panel by compressing it against the moulding surface of the moulding tool.

The panel may be a variety of elements, depending on the application. In the preferred embodiments described below, the panel is either a wing skin or part of a capping layer which is wrapped around the moulding tool.

A further aspect of the invention provides a method of manufacturing first and second parts, the method comprising:
  manufacturing the first part by:
    arranging a first component on a first mandrel;
    fitting the first mandrel into a mandrel recess of a moulding tool;
    arranging a first panel with a first portion of the panel engaging a moulding surface of the moulding tool and a second portion of the panel engaging the first component on the first mandrel;
    bonding the first portion of the panel to the first component by compressing them against the first mandrel; and
    moulding the second portion of the panel by compressing it against the moulding surface of the moulding tool;
  removing the first mandrel from the mandrel recess; and
  manufacturing the second part by:
    arranging a second component on the second mandrel;
    fitting the second mandrel into the mandrel recess of the moulding tool;
    arranging a second panel with a first portion of the panel engaging the moulding surface of the moulding tool and a second portion of the panel engaging the second component on the second mandrel;
    bonding the first portion of the panel to the second component by compressing them against the second mandrel; and
    moulding the second portion of the panel by compressing it against the moulding surface of the moulding tool.

A further aspect of the invention provides a method of manufacturing a part, the method comprising:
    arranging a set of components on a moulding tool; and
    simultaneously compressing the set of components on the moulding tool against a panel so as to bond the components to the panel,
wherein the set of components includes a plurality of stringers, and one or more additional components.

In one embodiment of the invention, the method further comprises:
    arranging a second set of components on the moulding tool; and
    compressing the second set of components on the moulding tool against a second panel so as to bond the second set of components to the second panel,
wherein the second set of components are compressed against the second panel at the same time that the first set of components are compressed against the first panel.

For example in one of the embodiments described below the first set of components are stringers etc. associated with an upper surface of a wing-box, and the second set are stringers etc. associated with a lower surface of a wing-box.

A further aspect of the invention provides a tool set comprising:
    at least two inner mould line tools;
    at least two outer mould line tools; and
    one or more spacers, each adapted to be removably fitted between the inner mould line tools so as to maintain a desired spacing between the inner mould line tools.

Such a tool set can be used in a method of manufacturing a part, the method comprising:
    arranging a first set of components on an outer face of a first inner mould line tool;
    arranging a second set of components on an outer face of a second inner mould line tool;
    fitting one or more spacers between the inner mould line tools, with the spacer(s) engaging inner faces of the inner mould line tools so as to maintain a desired spacing between the inner mould line tools;
    forming a layer around the inner mould line tools; fitting outer mould line tools on opposite sides of the inner mould line tools;
    moulding the part by compressing the layer and the components between the inner and outer mould line tools;
    removing the spacer(s);
    disengaging the inner mould line tools from the part after the spacer(s) have been removed; and
    removing the inner mould line tools from the part.

This method enables the inner mould line tools to be removed easily from the composite part after formation of the part. Typically the part is a tubular part such as a full wing-box.

A further aspect of the invention provides a method of manufacturing a part, the method comprising:
    arranging a set of components on one or more inner mould line tools;
    forming a layer around the inner mould line tool(s);
    fitting a pair of outer mould line tools on opposite sides of the inner mould line tool(s);
    moulding the part by compressing the layer and the components between the inner and outer mould line tools; and
    removing the inner mould line tool(s) from the part.

Typically the layer is formed by wrapping around the or each inner mould line tool. Typically the or each inner mould line tool is rotated as the layer is wrapped around the inner mould line tool(s), for instance by a filament winding machine.

The various aspects of the invention may be used to form an aircraft part such as a full or half wing-box, or may be used in a variety of non-aircraft applications. The part is typically, although not exclusively, formed from a composite material.

BRIEF DESCRIPTION OF THE DRAWINGS

Embodiments of the invention will now be described with reference to the accompanying drawings, in which:
FIG. 2a shows a first back-to-back mould tool;
FIG. 2b shows a second back-to-back mould tool.

DETAILED DESCRIPTION OF EMBODIMENT(S)

FIGS. 1 to 4 illustrate a process for manufacturing a half wing-box composite part.

Figure 1:
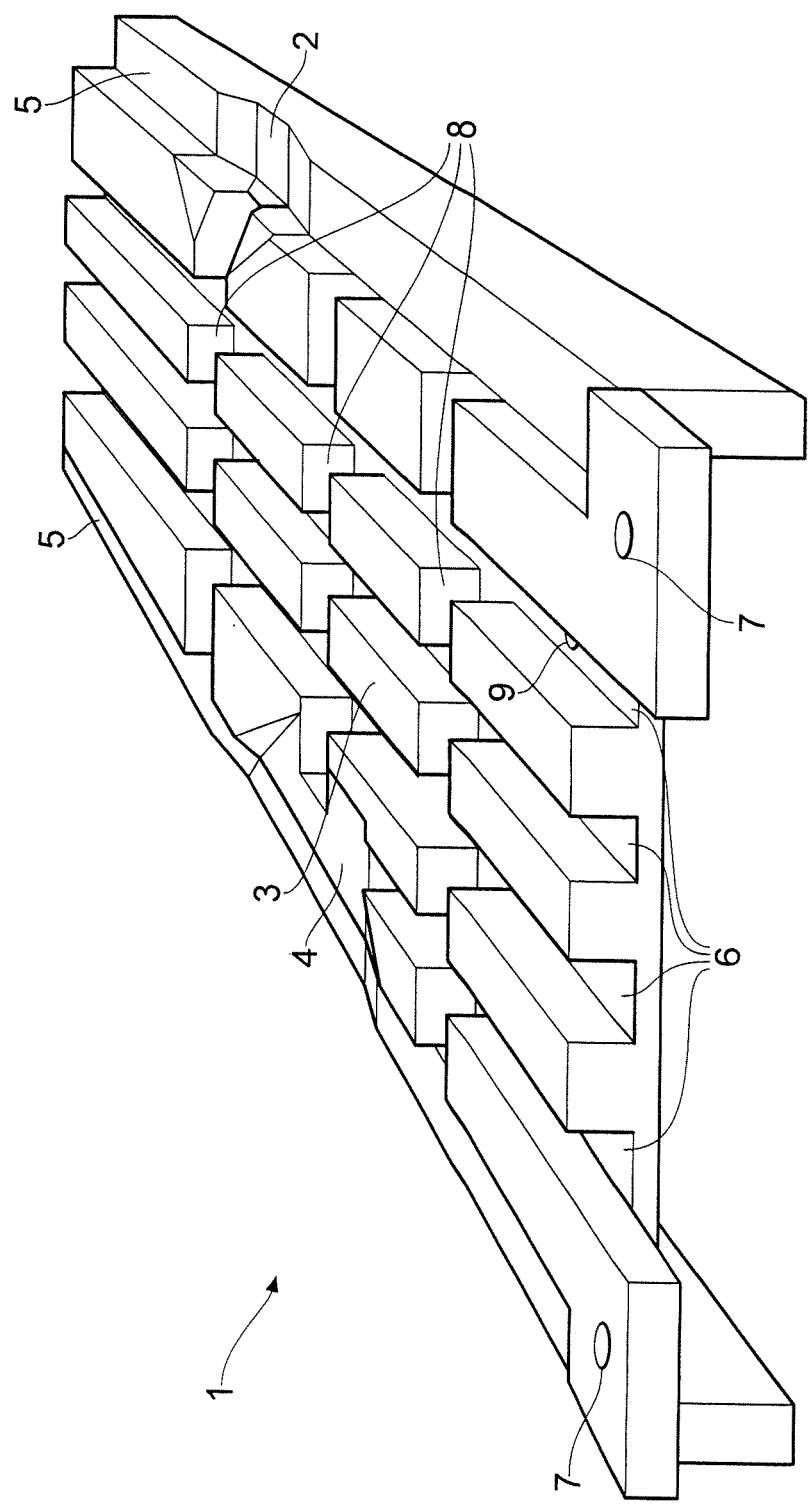
FIG. 1 shows an Inner Mould Line (IML) tool for a half wing-box part.

An inner mould line (IML) tool 1 shown in FIG. 1 comprises a contiguous piece of steel machined from a billet with an upper face defining an upper moulding surface. A pylon pad-up recess 2 and a landing gear pad-up recess 4 are machined in the leading and trailing edges of the upper moulding surface. Material is then removed from the upper moulding surface by machining to form a number of mandrel recesses. The mandrel recesses include spar channels 5 running spanwise along the leading and trailing edges of the tool, four stringer channels 6 running spanwise along the tool, and three rib foot channels 8 running chordwise across the tool. The stringer channels 6 and rib foot channels 8 each have a base and a pair of opposite side walls, whereas the spar channels, being formed at the edge of the upper moulding surface, have a base and only a single side wall. Mandrel locating holes are provided in the base of each mandrel recess. One of such holes 9 is partially visible in FIG. 1. The upper moulding surface is divided by the mandrel recesses into an array of islands 3. Tool locating holes 7 are provided at the root end of the tool 1.

A flexible surface covering (such as a laminate of pre-cured plies) may be bonded or bolted to the upper moulding surface before the mandrel recesses have been formed. The flexible surface covering can then be machined to form a desired moulding profile, and punched through to form the tool and mandrel locating holes.

A stringer mould tool 10 is shown in FIG. 2a. The tool comprises a pair of mandrels 11,12 arranged back-to-back. The mandrels 11,12 are similar in form and so only mandrel 11 will be described in detail. A stringer half is formed on the mandrel by laying a laminate charge (such as a prepreg) on the mandrel, and moulding the charge against two faces 15,16 of the mandrel. This may be achieved by a variety of manufacturing techniques. For example a flexible diaphragm may be laid over the charge, and one side of the diaphragm evacuated to mould the charge using hydrostatic pressure (in combination with heat). This results in an L-shaped stringer half, which is laid back to back with another stringer half formed over mandrel 12. A row of stringer preforms 30, each formed from a pair of stringer halves, is shown in FIG. 3.

The mandrels have location pins 13,14 which fit into the mandrel locator holes 9 in the base of the stringer recesses 6 to accurately locate the stringer mould tool. Although the male/female connection is provided in this case by male parts on the mandrels, and female holes in the mandrel recesses, in an alternative embodiment the male parts may be provided instead in the mandrel recesses.

Figure 3:
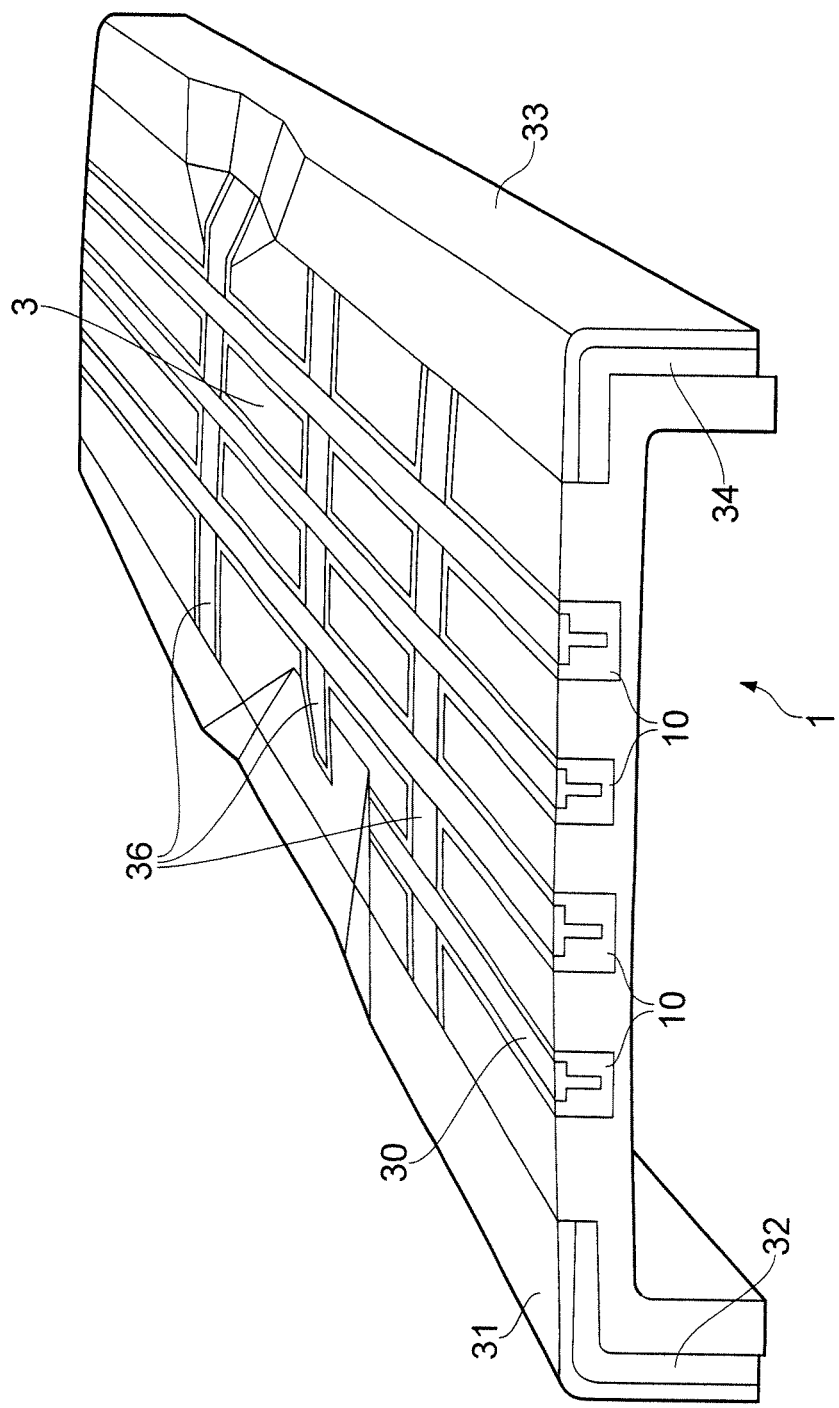
FIG. 3 shows the IML tool with the preforms and mandrels fitted.

A trailing edge spar-cap mandrel 34, shown in FIG. 3, is used to mould a trailing edge spar-cap preform 33 in a similar manner to the stringers 30. That is, a charge (such as a prepreg) is placed on the mandrel 34, and moulded the against two faces of the mandrel, for instance by vacuum forming. A leading edge spar-cap preform 31 is formed in a similar manner on a spar-cap mandrel 32.

Back-to-back rib foot tools (not shown), similar to the stringer tool 10, are used to mould T-shaped rib foot preforms 36 shown in FIG. 3.

An assembly line arrangement may be used to simultaneously manufacture the preforms, thus maximising the production rate.

After the spar-cap, stringer and rib foot preforms have been formed, they are transported to the IML tool 1 on their respective mandrels, and the mandrels are fitted into their respective channels in the tool as shown in FIG. 3. The preforms may be cured or uncured prior to being fitted onto the tool 1.

Note that the two-sided channels (that is the stringer channels 6 and the rib foot channels 8) receive their respective mandrel as a push fit to accurately locate the mandrel.

Figure 4:
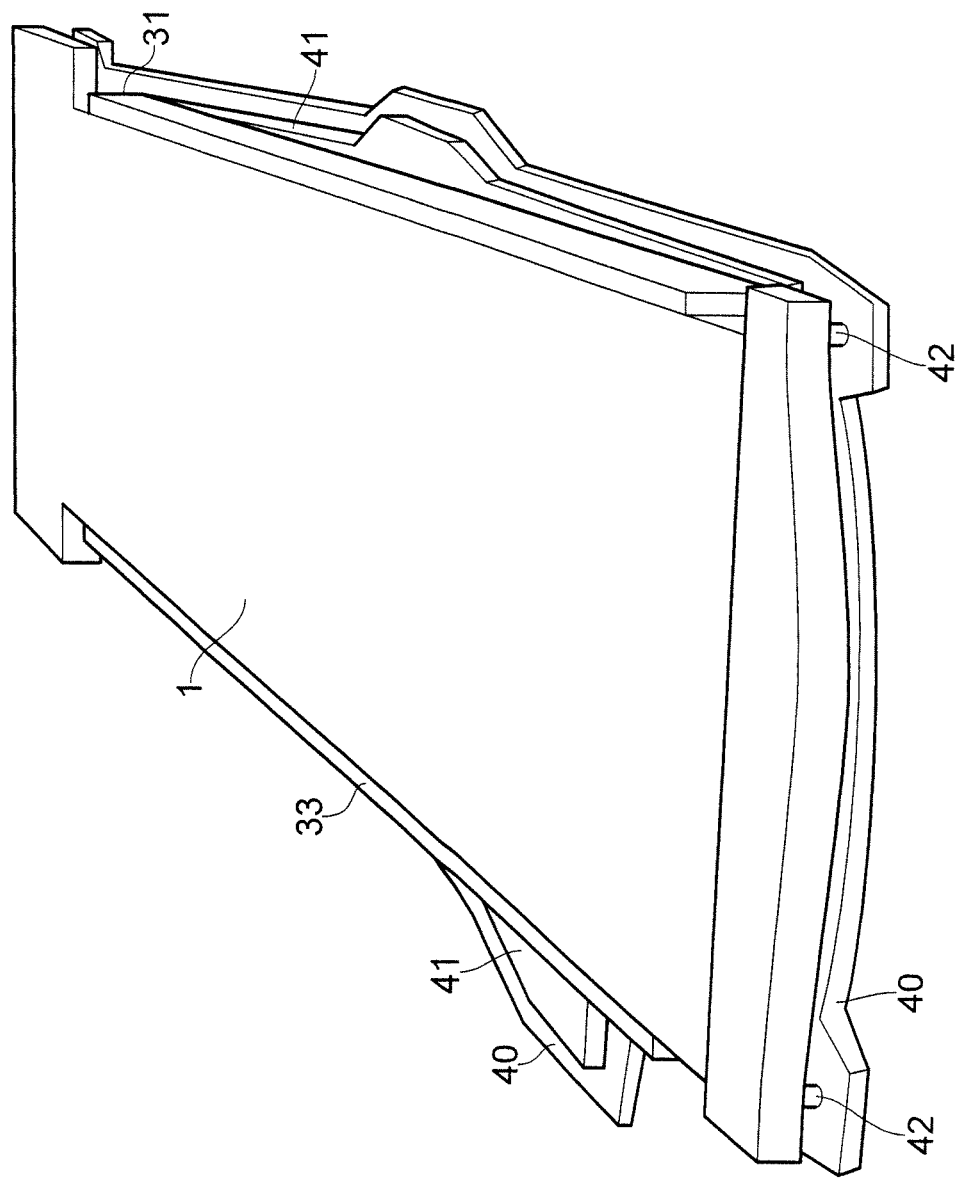
FIG. 4 shows a curing assembly for the half wing-box part.

FIG. 4 shows a curing assembly including the IML tool 1 and an outer mould line (OML) tool 40. The OML tool 40 is located horizontally on a curing jig (not shown) using locating holes (not shown) in the tool. A skin 41 is laid onto the OML tool 40. The skin 41 may be laid up by hand or using a tape laying machine, with prepreg or woven fabric. The IML tool 1 (with the preforms and mandrels in place as shown in FIG. 3) is inverted and placed on top of the skin to form the assembly shown in FIG. 4. Dowel pins 42 extending from the OML tool 40 fit into the locating holes 7 (see FIG. 1) in the IML tool 1 in order to accurately locate the IML and OML tools relative to each other.

The assembly of FIG. 4 is then sealed and encapsulated between a pair of flexible diaphragms. A vacuum is applied between the diaphragms to compress the IML and OML tools together, and heat and pressure are applied in an autoclave to cure the components and bond them together.

During cure, the skin 41 has a number of portions which engage with (and are compressed against) the islands 3 in the IML tool 1 and are thus moulded (on their inner face) to conform to the shape of the islands 3. Other portions of the skin engage with (and are compressed against) the stringers 30, rib feet 36, and spar caps 31,33 so as to bond them together. The components 30,36,31,33 are compressed and moulded on their other side by their respective mandrels.

The resulting half-wing part is then removed from the mould tools, and manholes and any other critical areas are machined to provide a part ready for assembly. In the final assembly of the wing box, the rib feet 36 are bolted to rib webs (not shown) and the spar-caps 31,33 are bolted to spar webs (not shown). The rib webs and spar webs are bolted in turn to another similar half-wing part (also not shown). Some additional bolting of the spar caps may be required in areas of high shear.

The IML tool 1 can be used as part of a modular tool set containing a number of different mandrels, each configured to fit into a mandrel recess and form a respective composite component. Thus for example the stringer mould tools 10 may be removed from the stringer mandrel channels 6 and substituted with alternative stringer mould tools which, whilst being shaped and sized to be received as a push fit into the channels 6, are configured to form a stringer of a different shape or size. Thus for example a stringer mould tool 10' shown in FIG. 2b may be used to form an I-shaped stringer 30' (instead of the T-shaped stringer 30 formed by the tool 10) in a subsequent co-curing/bonding process with a different skin The same modular approach can be employed for the spar caps and rib feet. This enables the same IML tool 1 to be used to form a number of different parts which each have a common general shape (as defined by the islands 3 which form the upper moulding surface) but have different components. This reduces the part count, thus minimising manufacturing costs.

The IML tool 1 has stringer mandrel recesses 5, and additional mandrel recesses each configured to receive a mandrel for an additional component (in this case, spar caps and rib feet). This integrated tooling approach saves on manufacturing time since it enables the stringers, spar caps and rib feet to be simultaneously bonded to the skin.

FIGS. 5 to 11 illustrate a process for manufacturing a full wing-box composite part.

Figure 5:
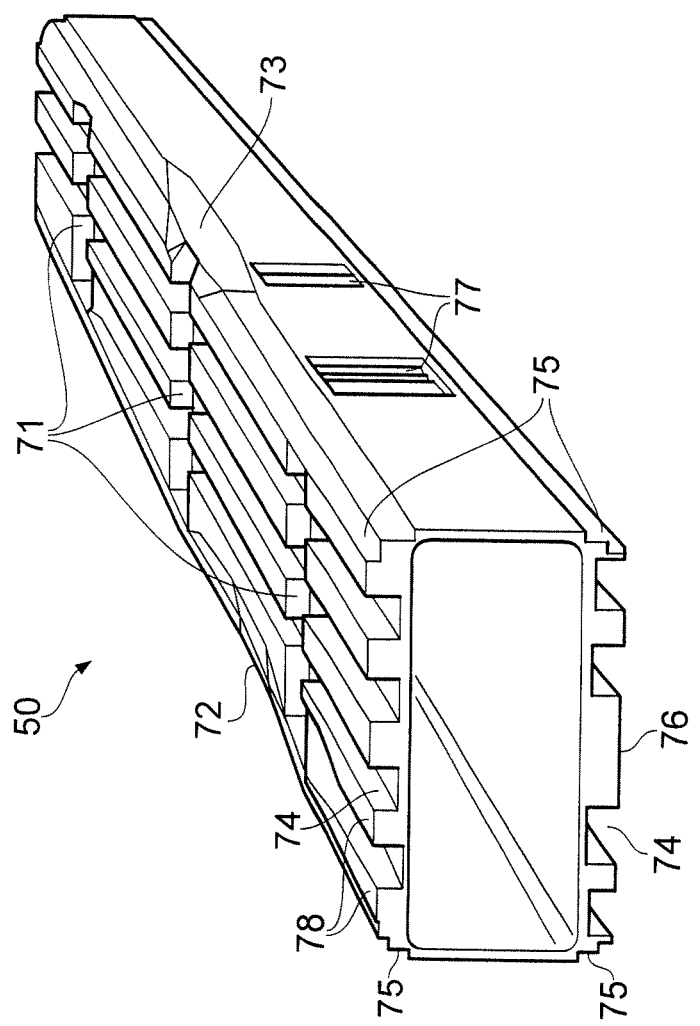
FIG. 5 shows an Inner Mould Line (IML) tool for a full wing-box part.

An inner mould line (IML) tool 50 shown in FIG. 5 comprises a contiguous piece of steel with an upper face defining an upper moulding surface, a lower face (opposite to the upper face) defining a lower moulding surface, and leading and trailing faces (adjacent to the upper and lower faces) defining leading and trailing moulding surfaces. A pylon pad-up recess 73 and a landing gear pad-up recess 72 are formed in the leading and trailing edges of the upper moulding surface. The moulding surfaces are then machined to form two pairs of upper and lower spar channels 75, upper and lower stringer channels 74 running spanwise along the tool, and upper and lower rib foot channels 71 running chordwise across the tool. Only the upper rib foot channels 71 are shown in FIG. 5, but similar rib channels are formed in the hidden lower moulding surface. Islands 78 are located between the channels. Rib post recesses 77 are formed in the leading and trailing moulding surfaces in line with the rib foot channels 71. Only two rib post recesses 77 are shown in FIG. 5, but a third rib post recess may be provided in line with the rib foot channel 71 at the far end of the tool. Flats are formed in the lower moulding surface in the desired positions of manholes in the finished wing box. Only a single flat 76 at the root end of the IML tool is shown in FIG. 5, but a number of such flats are positioned along the length of the hidden lower moulding surface.

A flexible surface covering (such as a laminate of pre-cured plies) may be wrapped around the tool 50 (and then bonded or bolted in place) before the mandrel recesses have been formed. The flexible surface covering can then be machined to form a desired moulding profile.

Stringers, rib feet and spar caps are formed in a similar manner to the stringers, rib feet and spar caps shown in FIG. 3, and fitted in place in their respective recesses on the IML tool 50. Rib posts (not shown) are also moulded onto back-to-back tools similar to the tool stringer tool 10 shown in FIG. 3, and the tools are fitted into the rib post recesses 77.

Figure 6:
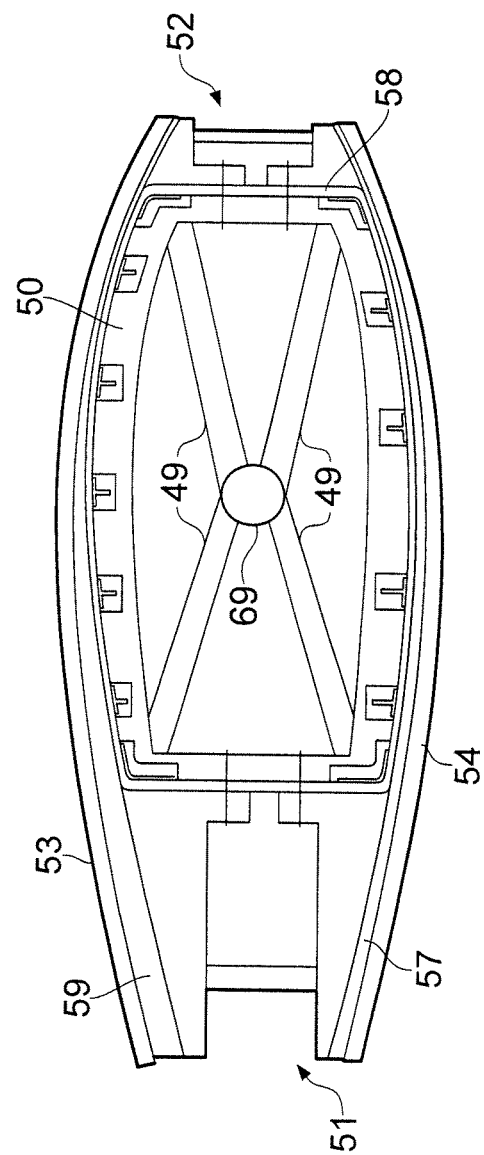
FIG. 6 is a sectional view through a curing assembly for the full wing-box part.
Figure 7:
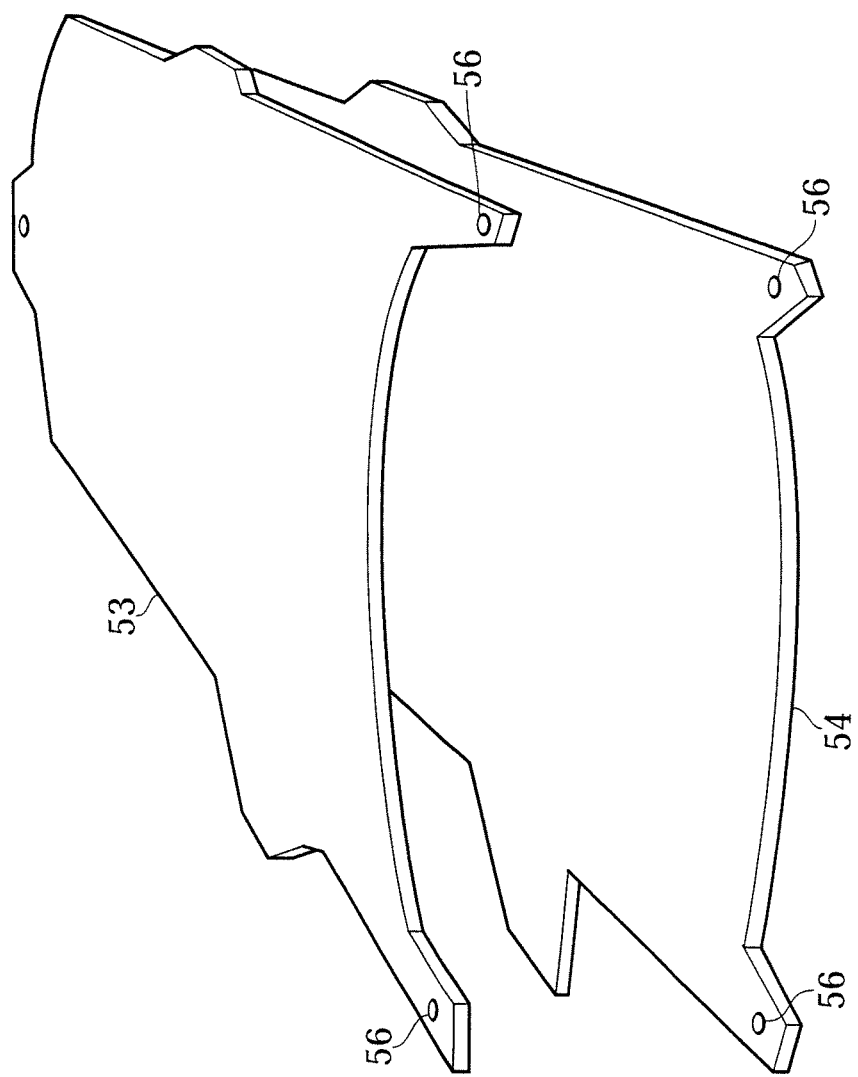
FIG. 7 shows the upper and lower Outer Mould Line (OML) used in the assembly of FIG. 6.

A set of four support struts 49 is shown in FIG. 6. A series of such sets of support struts 49 are mounted at intervals on a shaft 69 which runs along the centre line of the tool 50, with the ends of the struts 49 engaging the inner corners of the tool. The shaft 69 is rotated, and a capping layer 58 is wound onto the IML tool 50 by a filament winding machine as it rotates. The capping layer 58 comprises a series of capping plies. The fibres in most of the capping plies are likely to run at an angle of approximately 90° to the spanwise direction of the tool (that is, the axis of rotation of the tool). However, angles of up to 45° may be achieved by moving the spool of the filament winding machine at an angle to the shaft as the spool unwinds.

FIG. 6 shows a curing assembly including the IML tool 50, an upper cover OML tool 53, a lower cover OML tool 54, a Main Landing Gear (MLG) IML tool 51, and a Pylon IML tool 52.

The lower cover OML tool 54 is located horizontally on a curing jig (not shown) with pins of the tooling jig passing through locating holes 56 (shown in FIG. 7) in the tool 54. A lower skin 57 is laid onto the lower cover OML tool 54. The IML tool 50 (with the preforms and mandrels in place as shown in FIG. 6) is placed on top of the skin 57 as shown in FIG. 6, with the pins of the tooling jig passing through holes (not shown) in the IML tool 50 to accurately locate the IML and OML tools relative to each other.

The MLG IML tool 51 and Pylon IML tool 52 are then positioned in place as shown in FIG. 6.

Figure 8:
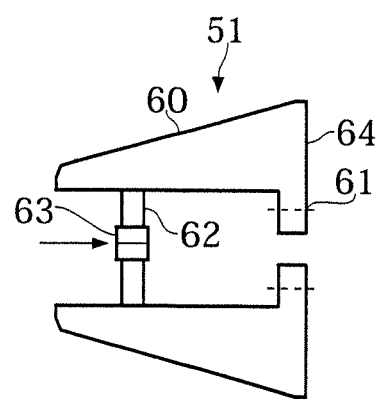
FIG. 8 is a side view of a Main Landing Gear (MLG) IML tool used in the assembly of FIG. 6.

The MLG IML tool 51 is shown in detail in FIG. 8. The tool 51 is symmetrical about its centre line, so only the upper half will be described in detail. The upper half comprises an upper caul plate with an upper face 60 which engages the upper skin 59 and a side face 64 which engages the capping layer 58. The side face 64 extends into a flange with a pilot hole 61. A pin 62 has a nut 63 threaded onto its distal end (not shown).

The nut 63 engages the nut carried by the lower caul plate, and one or both of the nuts can be rotated to adjust the spacing between the caul plates, thus ensuring accurate thickness for the upper and lower skins 57,59.

Figure 10:
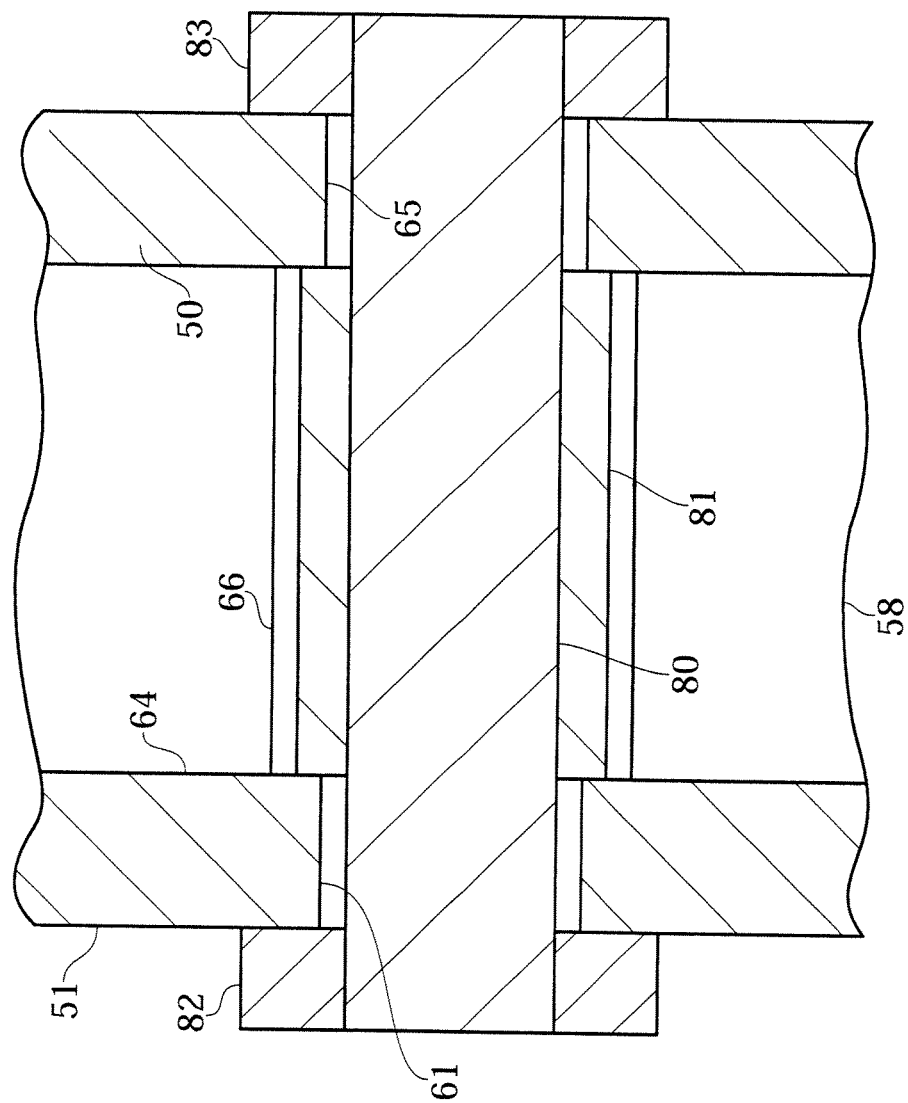
FIG. 10 is a cross-sectional view showing one of the interfaces between the MLG IML tool and the wing-box IML tool in the assembly of FIG. 6.

An interface between the MLG IML tool 51 and the IML tool 50 is shown in FIG. 10. The tool 51 may extend along the length of the tool 50, or may be located in line with the landing gear pad-up recess 52. The tool 50 has a pilot hole 65 aligned with the pilot hole 61 in the tool 51. A pilot hole 66 is punched through the capping layer 58 in line with the pilot holes 61,65. A bolt 80 is passed through the pilot holes 61,65,66 and held in place by nuts 82, 83. A cylindrical collar 81 is fitted onto the bolt 80 and engages the opposed faces of the tools 50,51. The length of the collar 81 is carefully controlled to accurately set the spacing between the tools, and thus the thickness of the capping layer 58.

Figure 9:
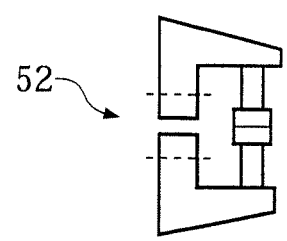
FIG. 9 is a side view of a Pylon IML tool used in the assembly of FIG. 6.

The Pylon IML tool 52 is shown in detail in FIG. 9. It has a similar construction to the tool 51 so will not be described in detail. Similar bolt interfaces are provided between the tool 52 and the IML tool 50.

The tools 50,51,52 are then secured, removed from the jig, and rotated by 180°.

The upper cover OML tool 53 is located horizontally on the curing jig using the pins on the curing jig passing through locating holes 56 in the tool 53. An upper skin 59 is laid onto the upper cover OML tool 53. The tools 50,51,52 are then placed on top of the skin 59, with the pins of the tooling jig passing through holes (not shown) in the IML tool 50 to accurately locate the IML and OML tools relative to each other.

The assembly of FIG. 6 is then secured, sealed and bagged for curing in an autoclave.

The IML tool 50 (in common with the IML tool 1) can be used as part of a modular tool set containing a number of different mandrels, each configured to fit into a mandrel recess and form a respective composite component.

The IML tool 50 has stringer mandrel recesses, and additional mandrel recesses each configured to receive a mandrel for an additional component (in this case, spar caps, rib posts and rib feet). This integrated tooling approach saves on manufacturing time since it enables the stringers, spar caps, rib posts and rib feet to be simultaneously bonded. Also, the full wing-box IML tool enables the upper and lower skins to be bonded to their respective components at the same time, reducing assembly time and cost compared with the half wing-box version. Also, there is no additional assembly step required to bolt the spar caps to a spar web—the spar web being provided by the capping layer 58.

However the half-wing box version, producing a smaller part, enables non-destructive testing to be performed more easily on the part.

The OML tools are then removed, and the IML tools removed from the larger root end of the full wing-box part. Manholes and any other critical areas are then machined to provide a part ready for assembly. During assembly, rib webs are passed through the root end of the wing-box and bolted to the rib posts and rib feet. Some additional bolting of the spar caps to the skins 57,59 may be required in areas of high shear.

Figure 12:
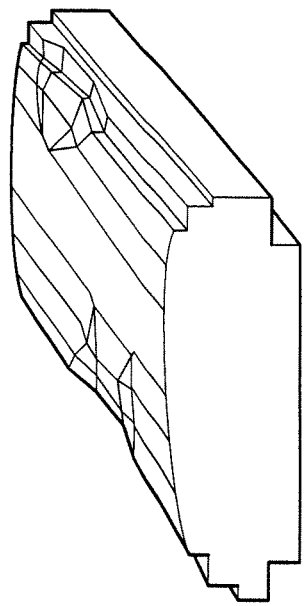
FIGS. 11-18 show the production of a half wing-box part.
Figure 11:
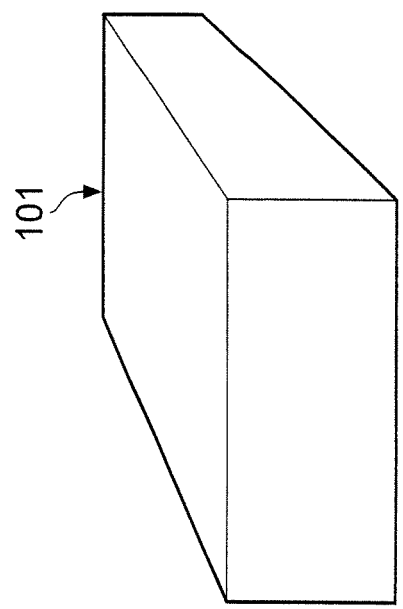
Figure 13:
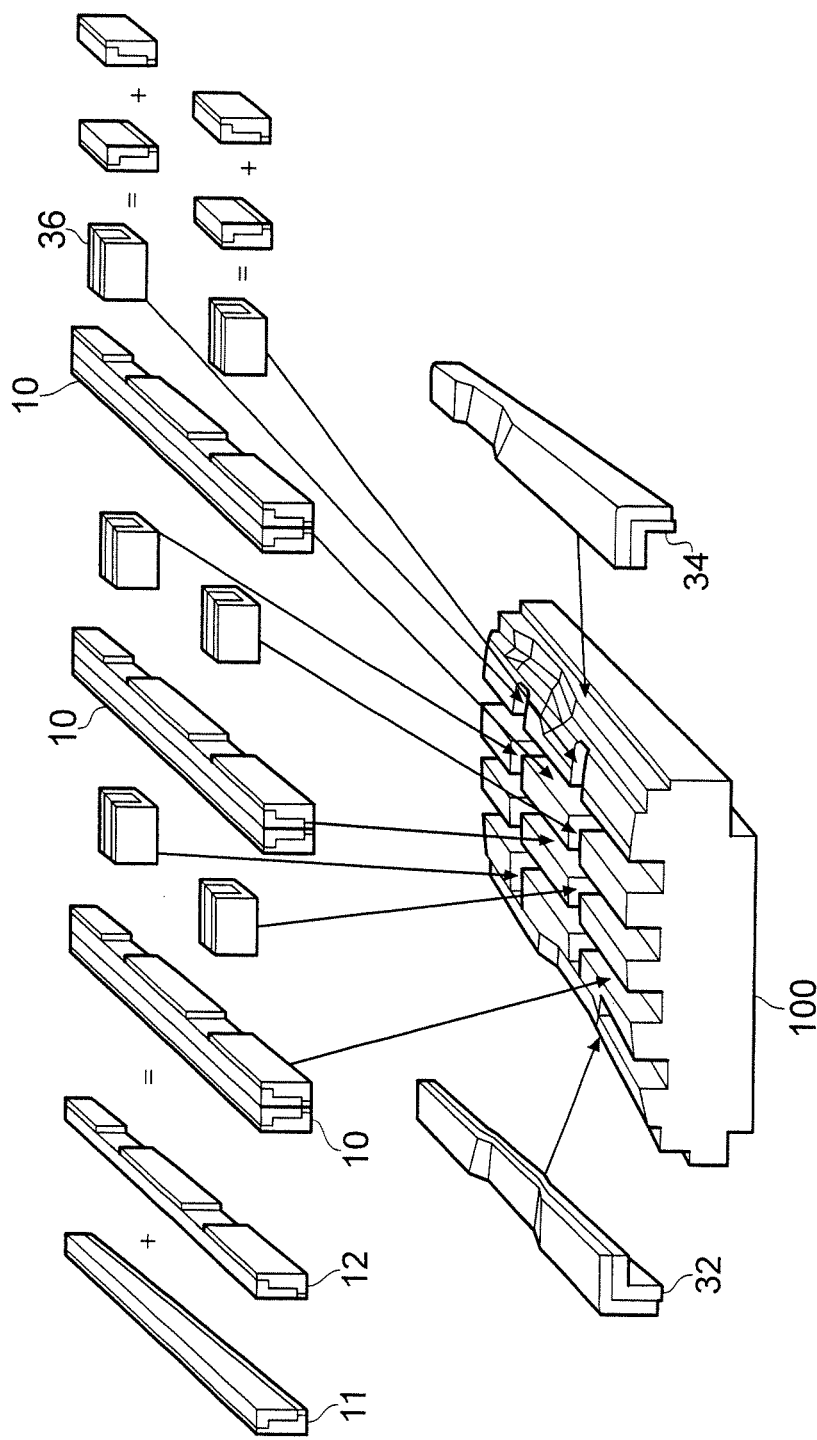
Figure 14:
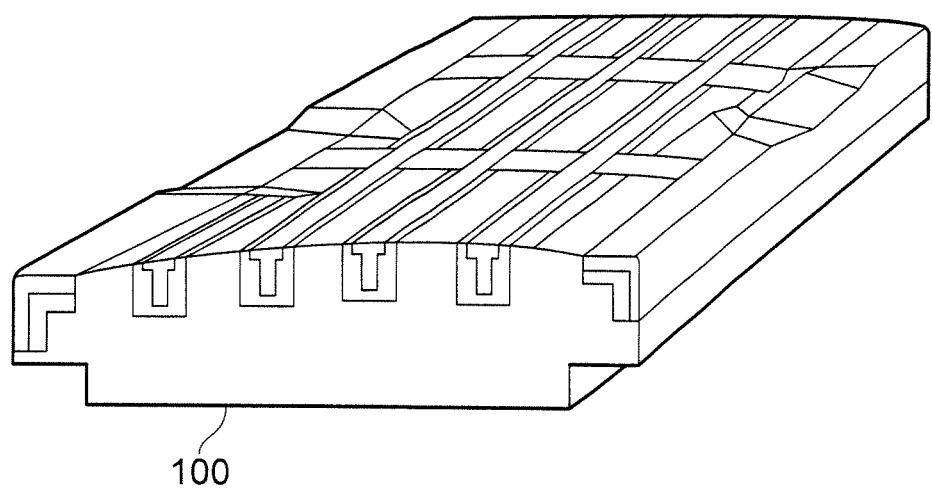
Figure 15:
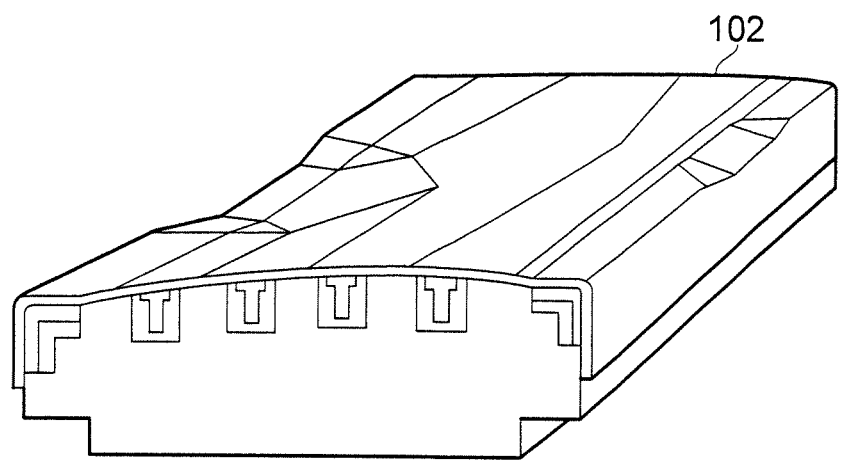

FIGS. 11-16 illustrate an alternative process for manufacturing a half wing-box composite part. The process is similar to the process shown in FIGS. 1-4, and only the differences will be described in detail. An IML tool 100 shown in FIG. 13 is formed from a billet 101 shown in FIG. 11 which is first machined to form the inner mould line surface, spar channels and pad-up recesses as shown in FIG. 12, and then machined to form the stringer and rib foot recesses as shown in FIG. 13. The tool 100 receives the same mandrels as the tool 1, and these are shown individually in FIG. 13 prior to insertion into their respective mandrel recesses. FIG. 14 shows the mandrels and preforms in place, and FIG. 15 shows a capping layer 102 which is then draped onto the tool.

Figure 16:
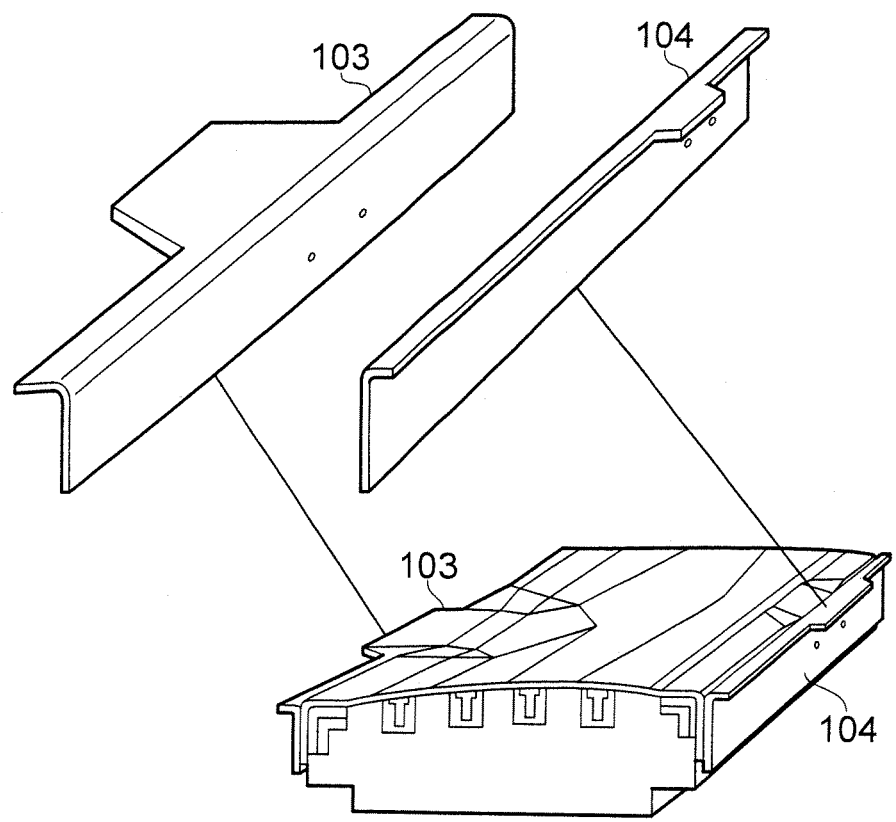
Figure 17:
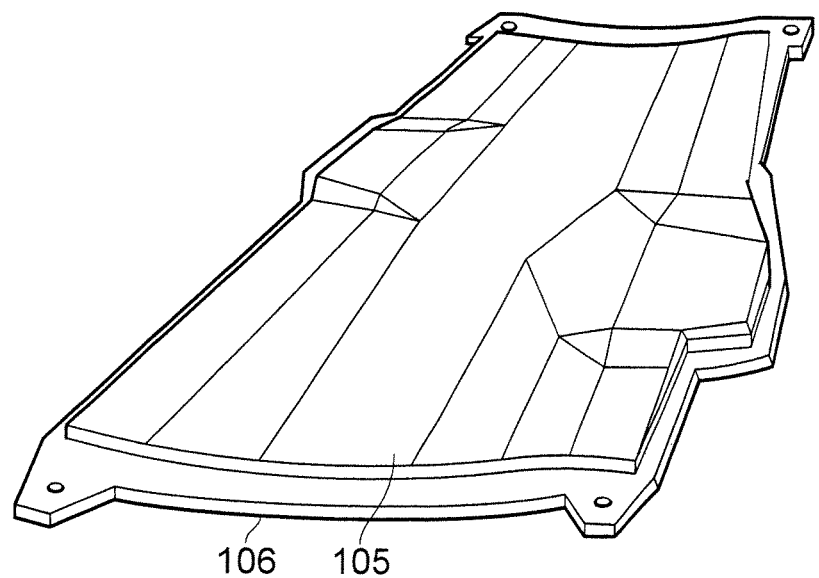
Figure 18:
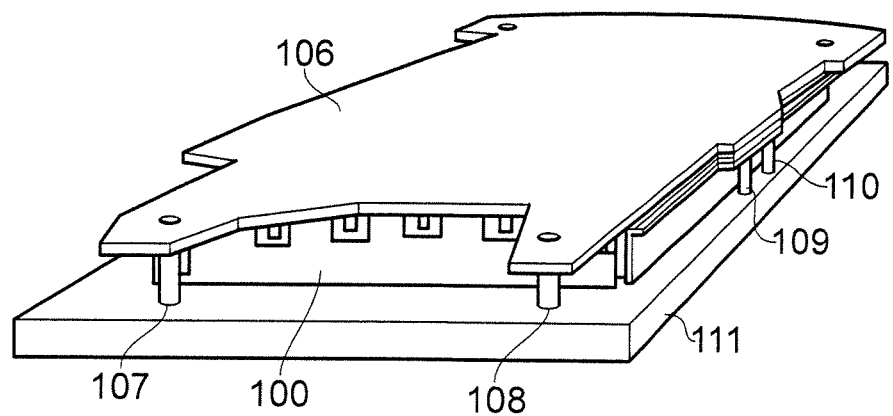

Caul plates 103,104 are then fitted to the leading and trailing edges as shown in FIG. 16. As shown in FIG. 17, a skin 105 is laid onto an OML tool 106. The tool 100 is placed onto the skin 105 as shown in FIG. 18, and dowel pins extending from a plate 111 are inserted into holes in the OML tool and caul plates to accurately position the parts. Four of the dowel pins 107-110 are shown in FIG. 18, the other dowel pins being hidden. The assembly of FIG. 18 is then bagged, and cured in an autoclave.

Figure 20:
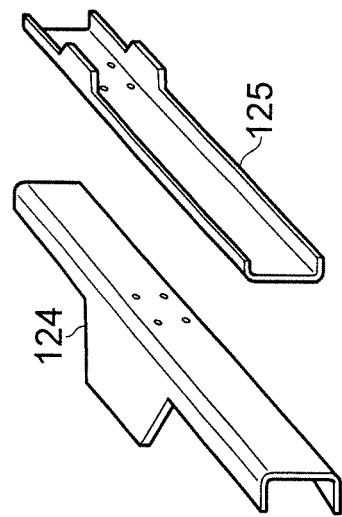
FIGS. 19-22 show the production of a full wing-box part.
Figure 19:
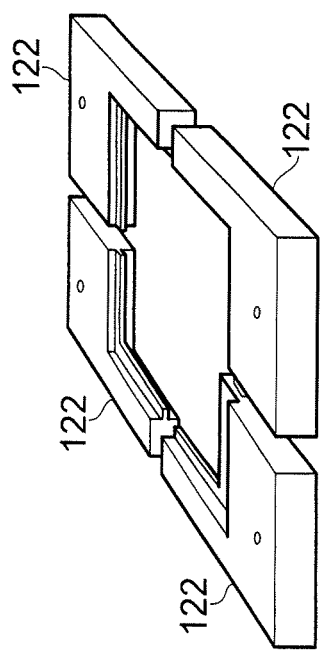
Figure 21:
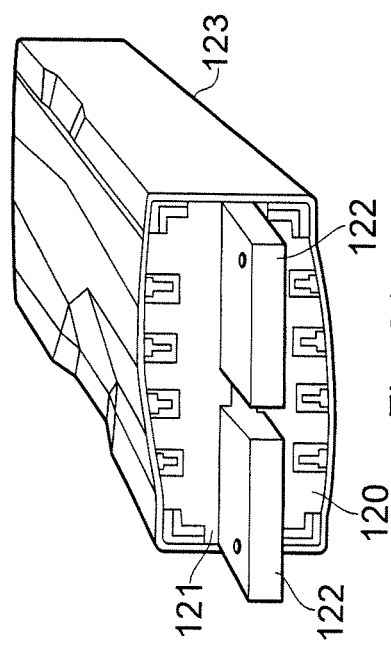

FIGS. 19-22 illustrate an alternative process for manufacturing a full wing-box composite part. A pair of IML tools 120,121 similar to the IML tool 100 are fitted with preforms as shown in FIG. 21. Four intercostal spacer plates 122, shown in FIG. 19, are removably fitted between the IML tools 121,120. The upper and lower faces of the spacer plates engage the inner faces of the inner mould line tools so as to maintain a desired spacing between them. A capping layer 123 is then wound onto the assembly as shown in FIG. 21. In contrast with the assembly of FIG. 6 in which the assembly is rotated on a shaft which runs along the centre line of the tool, the assembly of FIG. 21 can be rotated by the spacer plates 122.

Figure 22:
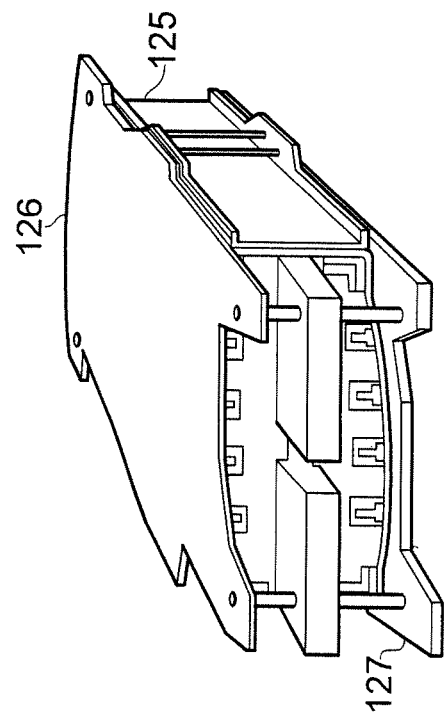

After the capping layer 123 has been formed, caul plates 124,125 shown in FIG. 20 are fitted as shown in FIG. 22. Upper and lower OML tools 126,127 (both carrying skins, not labelled) are then fitted as shown in FIG. 22. The assembly of FIG. 22 is then bagged, and cured in an autoclave.

After curing, the OML tools 126,127 and caul plates 124,125 are removed. The four intercostal spacer plates 122 can then be removed from the root and tip end of the wing box, or from the leading and trailing edges. This then enables the IML tools 120,121 to be disengaged from the cured wing box (by moving the upper tool 121 down, and moving the lower tool 120 up) and removed from the root end or the tip end.

Although the invention has been described above with reference to one or more preferred embodiments, it will be appreciated that various changes or modifications may be made without departing from the scope of the invention as defined in the appended claims.

The invention claimed is:

1. A tool set for manufacturing a wing-box, the tool set comprising:
    at least two inner mold line tools, each of said inner mold line tools have an inner face and an outer face, each of said outer faces having a respective set of channels, wherein each channel includes a base and opposite side walls;
    at least two outer mold line tools; and
    at least one spacer, wherein said at least one spacer has an upper face and a lower face, said lower face opposite to said upper face, wherein each of said at least one spacer is adapted to be removably fitted between the inner mold line tools with the upper and lower faces of the spacer engaging the inner faces of the inner mold line tools so as to maintain a desired spacing between the inner mold line tools.

2. A method of manufacturing a wing box, the method comprising:
    arranging a first set of components in a first set of recesses on an outer face of a first inner mold line tool, the first inner mold line tool having an inner face;
    arranging a second set of components in a second set of recesses on an outer face of a second inner mold line tool, the second inner mold line tool having an inner face;
    fitting at least one spacer between the inner mold line tools, with the spacer engaging inner faces of the inner mold line tools so as to maintain a desired spacing between the inner mold line tools, wherein each of said at least one spacer has an upper face and a lower face, said lower face opposite to said upper face, and each of said at least one spacer is fitted with the upper face and the lower face engaging the inner faces of the inner mold line tools;
    forming a layer around the inner mold line tools and forming a tubular part, said part having first and second open ends;
    fitting outer mold line tools on opposite sides of the inner mold line tools;
    molding the wing box by compressing the layer and the components between the inner and outer mold line tools;
    removing the at least one spacer;
    disengaging the inner mold line tools from the wing box after the at least one spacer have been removed; and
    removing the inner mold line tools from the wing box through at least one of the open ends.

3. The method of claim 2 wherein the layer is formed by wrapping around at least one of the inner mold line tools.

4. The method of claim 3 wherein the at least one inner mold line tool is rotated as the layer is wrapped around the at least one inner mold line tool.

5. The method of claim 2 wherein the layer is a contiguous layer and the forming includes wrapping the contiguous layer around the inner mold line tools.

6. The method of claim 5 wherein the at least one inner mold line tool is rotated as the layer is wrapped around the at least one inner mold line tool.

7. The method of claim 2, wherein the outer mold line tools are carrying skins when they are fitted on opposite sides of the inner mold line tools, and wherein the wing box is molded by compressing the layer, the skins and the components between the inner mold line tools and the outer mold line tools.

8. The method of claim 2 wherein the first set of components are arranged in the recesses on the outer face of the first inner mold line tool such that a surface of each of the components is contiguous with the outer face of the first inner mold line tool, and the outer face is defined by outer surfaces of islands on the first inner mold inner tool.

9. The method of claim 2 wherein the recesses of the first inner mold line tool each include a base and sidewalls, and the removal of the first inner mold line tool includes removing the base and the sidewalls intact.

10. The method of claim 2 wherein:
    the forming of the layer includes applying the layer as a contiguous layer entirely covering the outer face of the first inner mold line tool and the outer face of the second inner mold line tool.

* * * * *